United States Patent
Lee

Patent Number: 5,973,640
Date of Patent: Oct. 26, 1999

[54] METHOD AND DEVICE FOR MANAGING STATUS/ALARM MESSAGE OF GPS RECEIVER AND BROADCASTING SYSTEM TIME

[75] Inventor: Keun-Ju Lee, Seoul, Rep. of Korea

[73] Assignee: Samsung Electronics Co., Ltd., Rep. of Korea

[21] Appl. No.: 08/957,114

[22] Filed: Oct. 24, 1997

[30] Foreign Application Priority Data

Jan. 17, 1997 [KR] Rep. of Korea .................. 97-1238

[51] Int. Cl.⁶ .................................................. G01S 5/02
[52] U.S. Cl. ..................... 342/357.1; 370/338; 455/507
[58] Field of Search .............................. 342/357, 357.1; 701/213; 370/338; 455/507

[56] References Cited

U.S. PATENT DOCUMENTS

| | | | |
|---|---|---|---|
| 5,525,999 | 6/1996 | King et al. ............................ | 342/357 |
| 5,732,076 | 3/1998 | Ketseoglou et al. .................. | 370/347 |
| 5,736,964 | 4/1998 | Ghosh et al. .......................... | 342/457 |
| 5,786,773 | 7/1998 | Murphy ................................. | 340/947 |
| 5,790,975 | 8/1998 | Tognazzini ........................... | 701/204 |

*Primary Examiner*—Mark Hellner
*Attorney, Agent, or Firm*—Dilworth & Barrese

[57] ABSTRACT

Apparatus and methods for managing a detailed status message and alarm message of a global positioning system (GPS) receiver and broadcasting an accurate system time. The GPS receiver receives current time and positional information from a global positioning system satellite, to generate clocks to respective blocks in a base station and to generate self status and alarm message data and system time message data. A base station control processor receives the status and alarm message data and system time message data, and separates the system time therefrom to immediately broadcast the system time to processors of the base station. The base station control processor also periodically checks for a change of the status and alarm message in the system time message data to report the change of the status and alarm message to a base station control device.

17 Claims, 7 Drawing Sheets

METHOD AND DEVICE FOR MANAGING STATUS/ALARM MESSAGE OF GPS RECEIVER AND BROADCASTING SYSTEM TIME

BACKGROUND OF THE INVENTION

1. Field of the Invention

The present invention relates to personal communication services systems, and more particularly to an apparatus and method for managing a status and alarm message and for broadcasting system time in a global positioning system receiver.

2. Description of the Related Art

FIG. 1 illustrates a personal communication services (PCS) system. The PCS system includes a plurality of Gateway Communication Interconnection Networks (GCINs) and, a plurality of link paths formed between Mobile Switching Centers (MSCs). Since, the PCS system does not have link paths formed directly between the GCINs, it may not be possible to provide an inter-process communication (IPC) between the GCINs. Accordingly, for a hand-off or exchange of data between the GCINs, the PCS system uses a hard hand-off path between the MSCs. However, this hand-off may generate an unavoidable call lag of over 100 msec. A Communication Interconnection Network (CIN), which includes the GCIN and Local Communication Interconnection Networks (LCINs), provides a packet data transmission path between a Base Station Transceiver Subsystem (BTS) and a Base Station Controller (BSC) to transfer data and signals through the CIN.

FIG. 2 illustrates a block diagram of a device for broadcasting Time of Date (TOD) message data from a global positioning system receiver (GPSR) according to the prior art. As illustrated, in a conventional Code Division Multiple Access (CDMA) system, Time and Frequency Processors (TFPs) 4-1 and 4-2 on a Time and Frequency Controller Assembly (TFCA) board receive TOD message data from GPSRs 2-1 and 2-2.

The TOD message data from GPSRs 2-1 and 2-2 is commonly composed of 16 bytes of information, where 11-bytes represent the system time, 1-byte represents the status of the GPSR, 1-byte represents an alarm of the GPSR, 2-bytes represent a leap second, and 1-byte represents the end of the message. The system time includes the year, month, day, hour, minute and second. The TFPs 4-1 and 4-2 manage and report the status and the alarms of GPSRs 2-1 and 2-2 based on the received TOD message data. The TFPs 4-1 and 4-2 also calculate the system time in units of seconds to broadcast the calculated system time to respective processors in BTS 10 through a High Capacity IPC Node Board Assembly (HINA). The BTS 10 includes GPSRs 2-1 and 2-2, TFPs 4-1 and 4-2, and BTS Control Processors (BCPs) 6-1 and 6-2. A Call Control Processor (CCP) 8 belonging to the BSC is connected to BTS 10 to control a call.

In the PCS system which is significantly modified from the conventional CDMA system, software for processing the TOD message data is also modified. The dotted line terminating at an arrow at each end in FIG. 2 represents the synchronization of GPSRs 2-1 and 2-2 for the PCS system. The TFPs 4-1 and 4-2 on the TFCA board receive a 10 MHz unit clock of 1 Pulse Per Second (1 PPS) for generating a system clock which is supplied to designated boards. The TFPs 4-1 and 4-2 also process the TOD message data.

However, the TFPs cannot report in detail the status and the alarm of the GPSR. The conventional method of managing the status and the alarm of the GPSRs is unnecessarily complex and time consuming. Also, the system time should be calculated from the TOD message data. Since the TFPs on the TFCA board manage the status and the alarm of the GPSR, the TFPs should also manage the associated clocks and the status and the alarm of the TFCA board itself to simplify the process. In addition, since software in the TFCA board is instrumental in generating and managing the clocks used in the system, it is difficult to effectively manage and control the clocks. This is because the synchronization of the GPSRs (when initialized) is controlled by software in the TFCA board, while generation and distribution of the clocks is processed by hardware within the TFCA board.

SUMMARY OF THE INVENTION

It is therefore an object of the present invention to provide an apparatus and method for managing detailed status and alarm messages of a GPSR, and for broadcasting an accurate system time.

Another object of the present invention is to provide an apparatus and method for readily maintaining a base station in a GPSR.

According to an embodiment of the present invention, a status and an alarm of a GPSR are expressed in detail in the TOD message data. This enables the detailed status and the alarm messages of the GPSR to be managed, and the system time may be easily separated from the TOD message data. This simplifies the complex time calculating process of the prior art, resulting in reduced operating time and malfunction occurrence. In addition, the BCP manages the TOD message data of the GPSR, without using the TFCA boards, so that an intermediate process step is omitted. Therefore, the system is more easily maintained, and detrimental effects on the system due to the switching over of the GPSRs (from an operational state to a waiting state, and vice versa) may be minimized.

In accordance with the present invention, the generation and distribution of the clocks are processed in the GPSR, not in the TFCA board, thereby providing a dual function. Since a software block for separating and broadcasting the system time of the TOD message data is moved into the software block in the BCP, it is possible to easily manage the status and the alarm of the GPSR and to broadcast the system time.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF PREFERRED EMBODIMENTS

Figure 1:
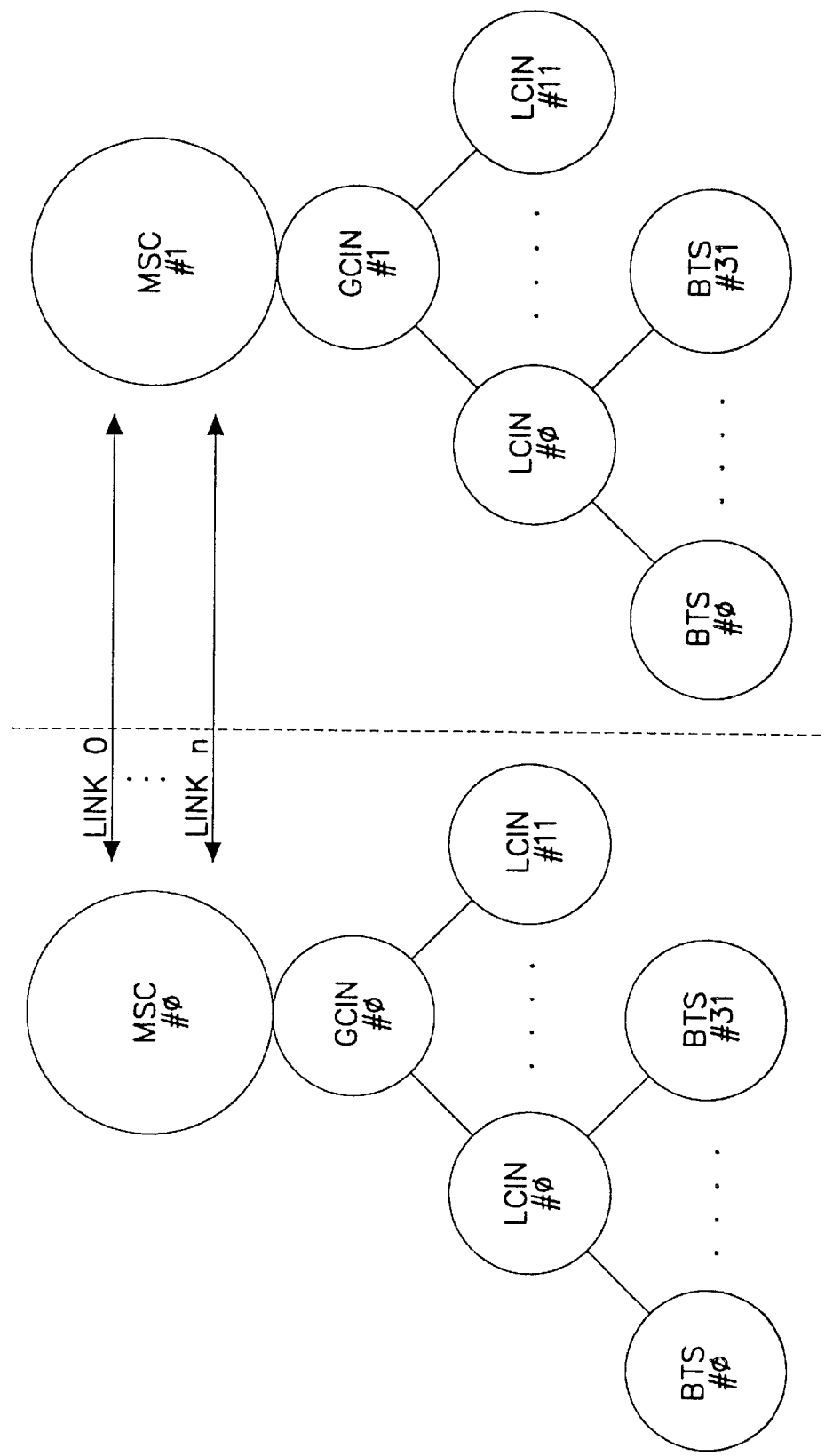
FIG. 1 is a diagram of a personal communication services (PCS) system.
Figure 2:
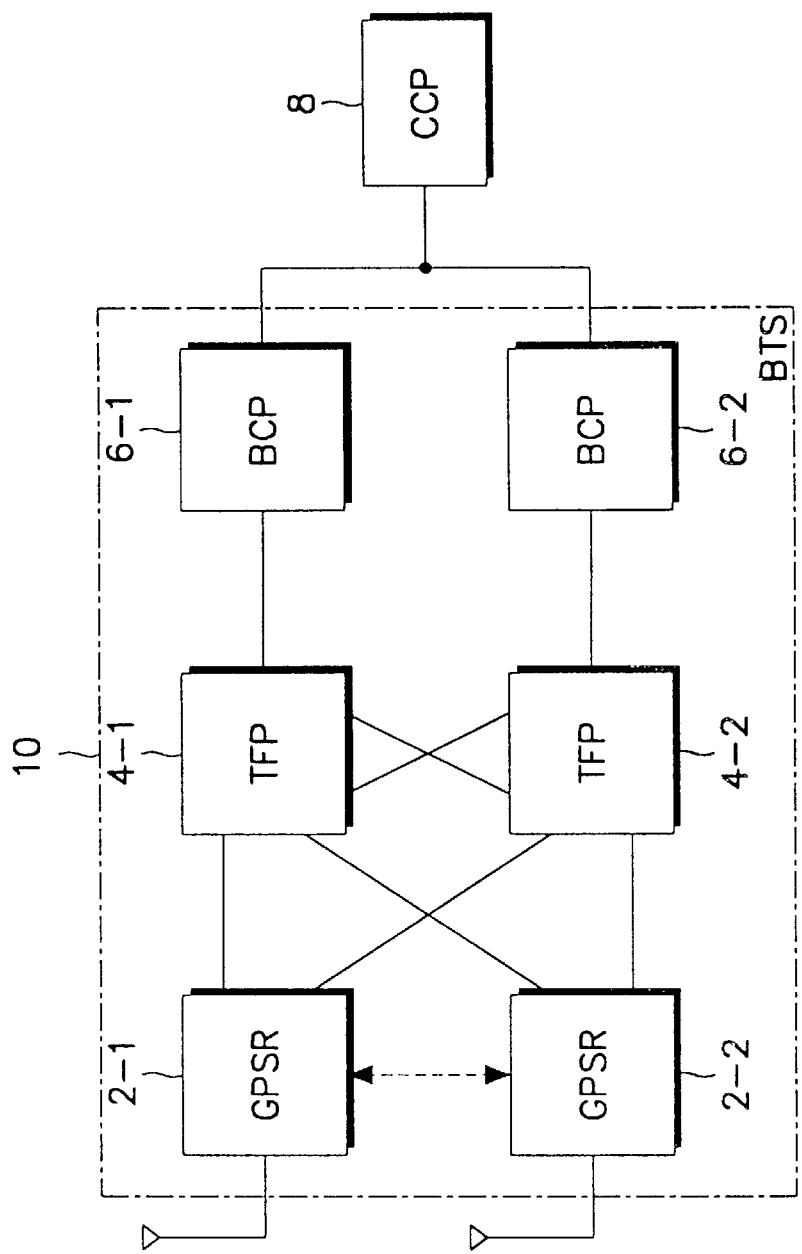
FIG. 2 is a block diagram of a device for broadcasting time of date (TOD) message data from a global positioning system receiver (GPSR) according to the prior art.

A preferred embodiment of the present invention will be described in detail hereinbelow with reference to the attached drawings, in which the like reference numerals represent the like elements. Further, it should be clearly understood that many specifics such as the detailed circuit elements are shown only by way of an example to bring a better understanding of the present invention and the present invention may be embodied without the specifics. Moreover, it should be noted that detailed descriptions on the related prior art may be intentionally omitted if it is believed to be unnecessary in describing the concepts of the present invention.

Figure 3:
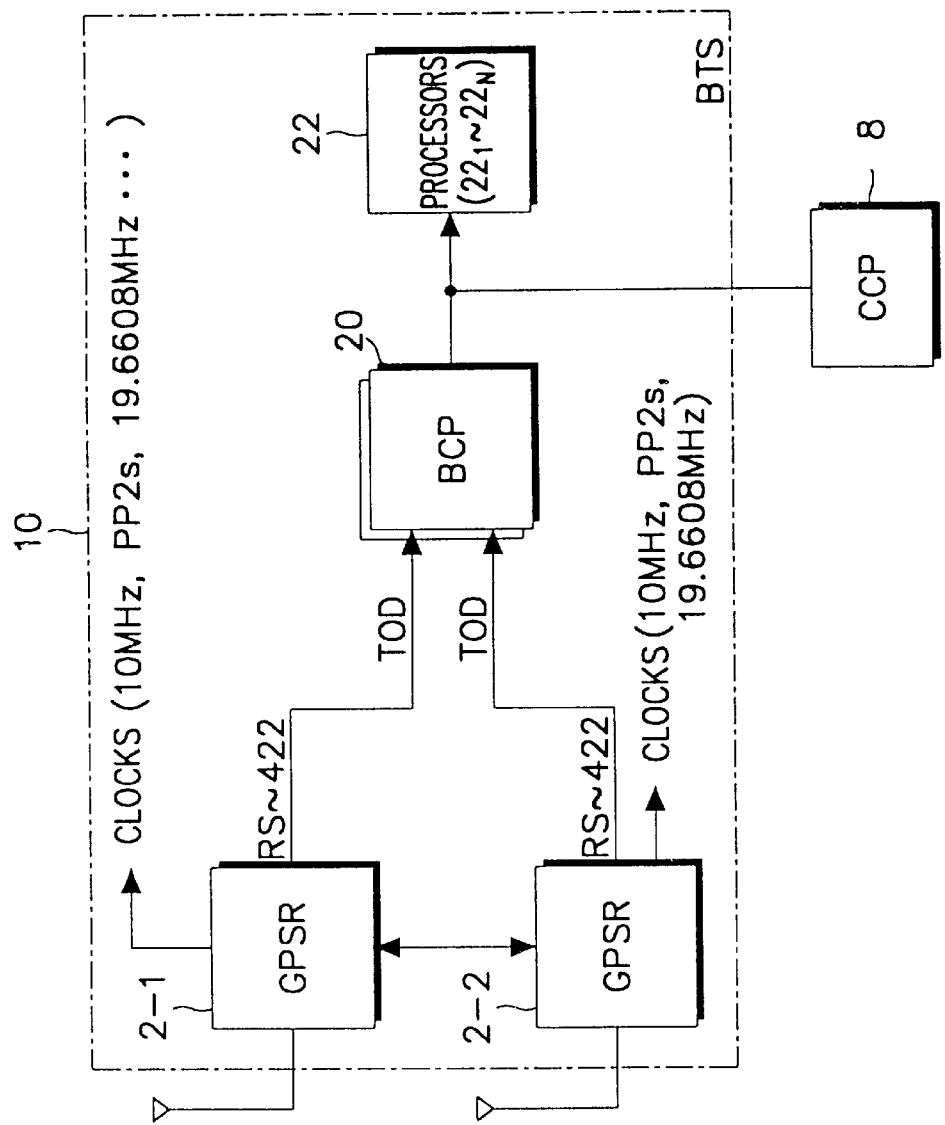
FIG. 3 is a block diagram of a base station transceiver station (BTS)

FIG. 3 is a partial block diagram of a base station transceiver substation (BTS). As shown, a BCP 20 receives TOD message data from GPSRs 2-1 and 2-2 for broadcasting a system time according to an embodiment of the present invention. The GPSRs 2-1 and 2-2 receive the current time and positional information from a Global Positioning System (GPS) satellite, and generate various kinds of clocks (e.g., 10 MHz, Pulse Per 2 Seconds (PP2S), 19.6608 MHz, etc.) to each block in BTS 10. Further, GPSRs 2-1 and 2-2 generate TOD message data shown in FIG. 6 to a dual BTS control processor (BCP) 20 through RS-422 interfaces.

Figure 6:
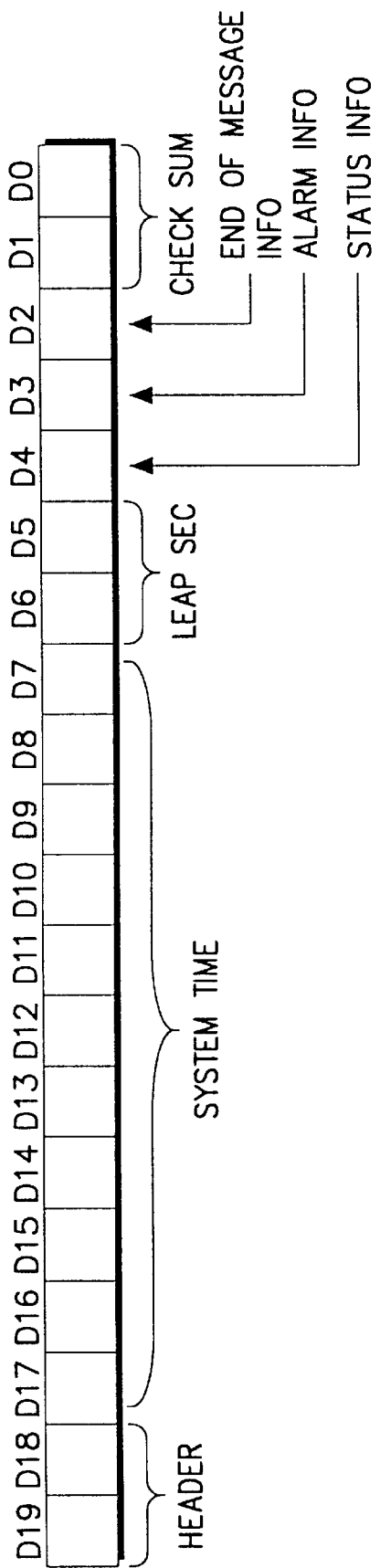
FIG. 6 is a diagram representing a time of date (TOD) message data format according to an embodiment of the present invention.

Referring to FIG. 6, the TOD message data D19–D0 is composed of a 2-byte header D19–D18, an 11-byte system time D17–D7, a 2-byte leap second information D6–D5, a single-byte status D4, a single-byte alarm D3, a single-byte end-of-message D2, and a 2-byte check sum D1–D0. The 2-byte header D19–D18 indicates that the current message is a TOD message. The 11-bytes D17–D7 contain the system time information in units of seconds. The byte D2 indicates the end of the message.

The status byte D4 is composed of 8 bits B7–B0 (i.e., 1 byte=8 bits), in which bit B7 represents a response, bit B6 represents whether the system time of the TOD message data is in units of seconds, and bit B5 represents whether GPSRs 2-1 and 2-2 are operating or not. Bit B4 represents whether the system time received from the GPS satellite has continued over 24 hours, and bit B3 represents whether GPSRs 2-1 and 2-2 are in operating status or not. Bits B2 and B1 represent the leap seconds, and bit B0 represents whether GPSRs 2-1 and 2-2 are synchronized with each other.

Figure 5:
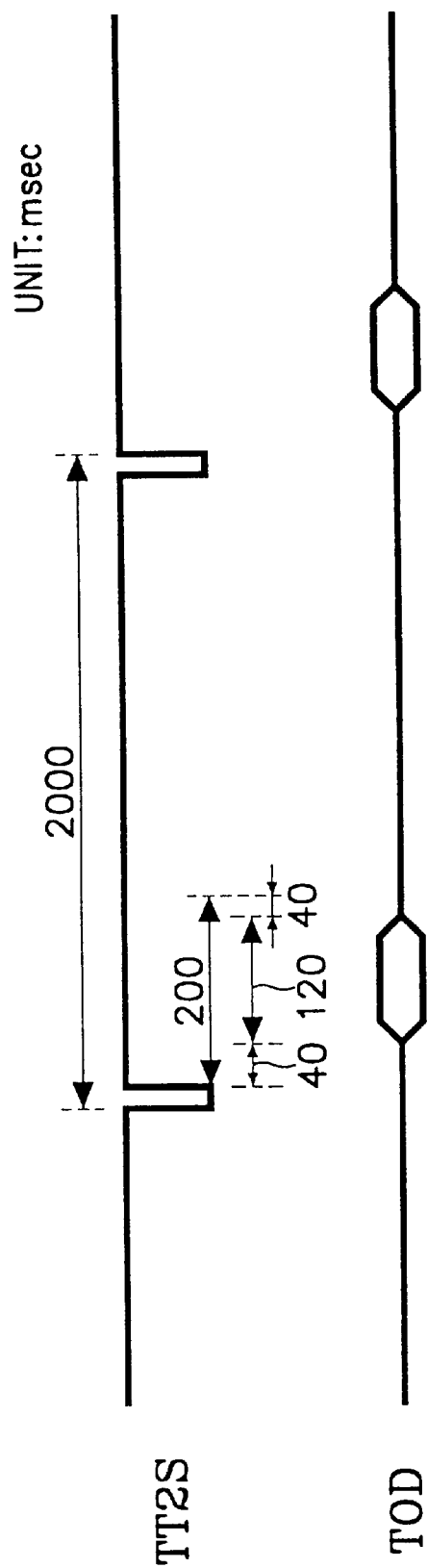
FIG. 5 is a timing diagram of the time of date (TOD) message data transferred from the GPSR to the BTS Control Processor (BCP)

Similarly, the alarm information D3 is composed of 8 bits B7–B0, in which bit B7 represents whether the clock is stable or unstable, and bit B6 is set when GPSRs 2-1 and 2-2 are switched over from an operating status to a waiting status or from a waiting status to an operating status. Bit B5 represents whether the system time received from the GPS satellite has continued over 24 hours. Bit B4 represents a frequency control, and bit B3 represents whether an antenna has failed. Further, bit B1 represents whether GPSRs 2-1 and 2-2 have failed, and bit B0 represents the positions of GPSRs 2-1 and 2-2. The TOD message data shown in FIG. 6 is transferred to GPSRs 2-1 and 2-2 every 2 seconds, in accordance with the timing diagram shown in FIG. 5.

The BCP 20, a main processor board of a base station transceiver substation (BTS) 10 of the PCS mobile communication system, receives the TOD message data, shown in FIG. 6, from GPSRs 2-1 and 2-2, to perform status management, alarm management, a reporting function, and a control function. The BCP 20 includes a plurality of separate software blocks, each of which simultaneously run under a Real Time Multitasking Operating System (RMOS) environment to perform its own unique function.

Figure 4:
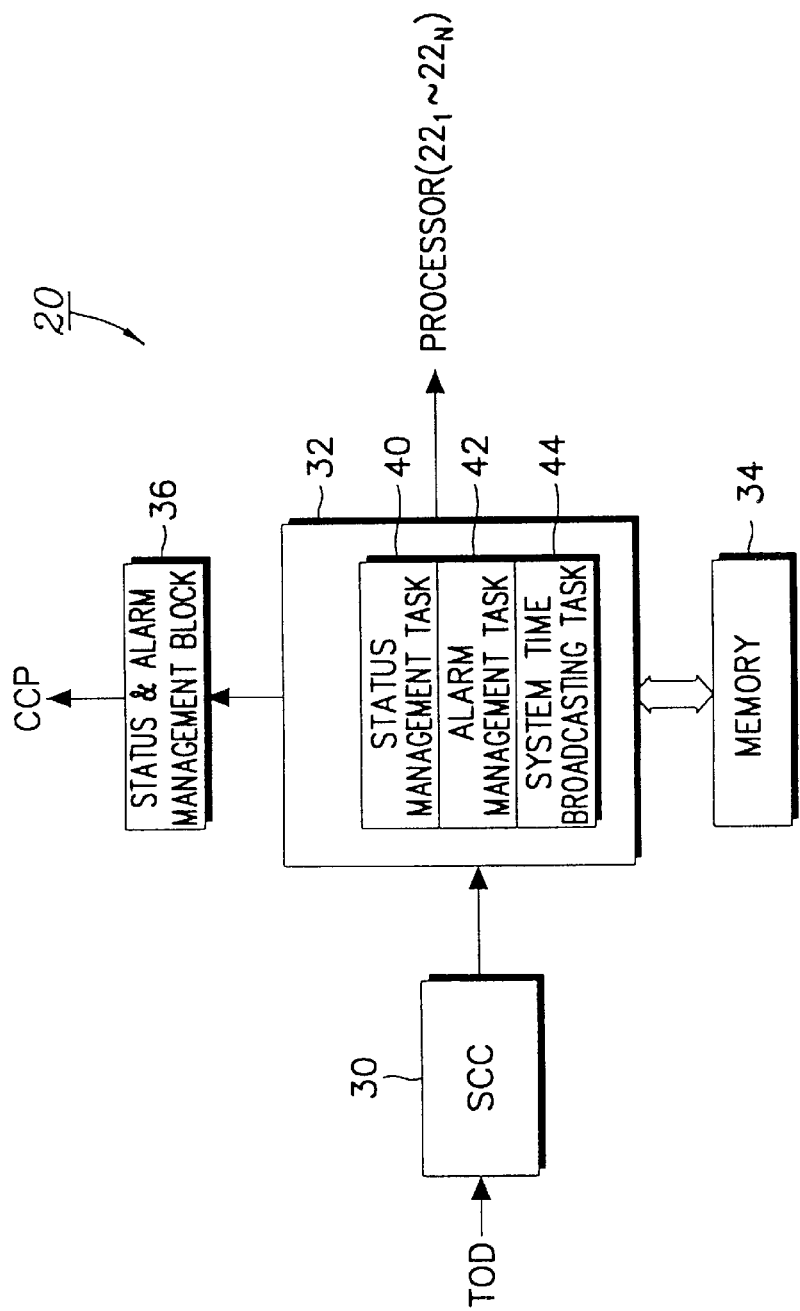
FIG. 4 is a detailed block diagram of the BTS Control Processor (BCP) shown in FIG. 3.

FIG. 4 illustrates a detailed block diagram of the BCP 20 shown in FIG. 3. The BCP 20 includes a serial communication controller (SCC) 30 implemented in hardware, a management and broadcasting control block 32 implemented in software in a Central Processing Unit (CPU, which is not shown), a memory 34, and a status and alarm management block 36. The management and broadcasting control block 32 includes a status management task 40, an alarm management task 42, and a system time broadcasting task 44. The management and broadcasting control block 32 manages and reports the status and the alarm based on the TOD message data received from GPSRs 2-1 and 2-2, and also broadcasts the system time. The alarm and status messages reported by the management and broadcasting control block 32 are transferred to the CCP 8 belonging to the base station controller BSC through status and alarm management block 36. The system time broadcasted by management and broadcasting control block 32 is transferred to all processors $22_1$–$22_N$ in BTS 10, which can receive the system time data information at any time.

Figure 7:
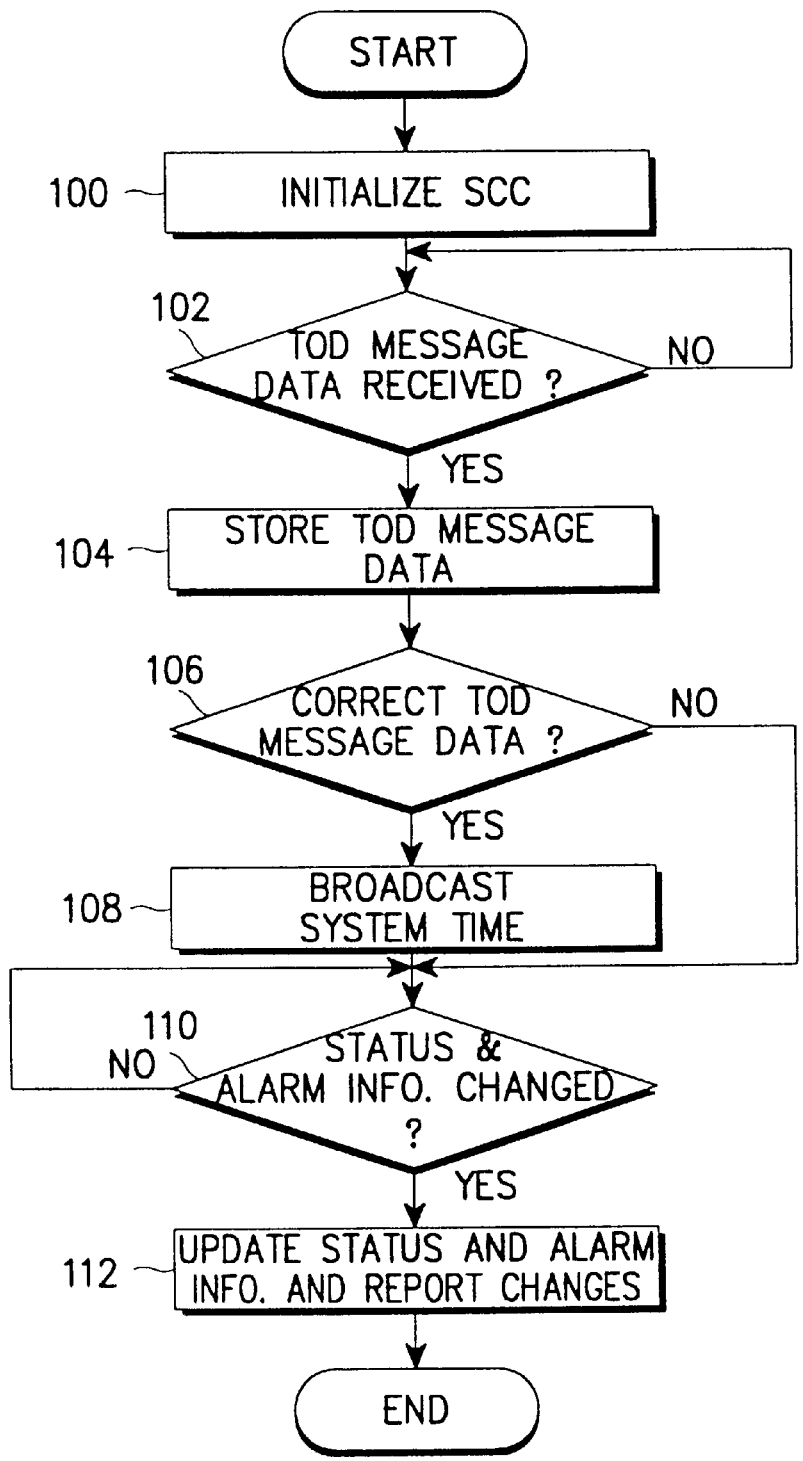
FIG. 7 is a flow chart diagram illustrating a method for managing a status message and an alarm message of a GPSR and for broadcasting a system time according to an embodiment of the present invention.

Now, referring to FIGS. 4 and 7, the operation of BCP 20 when the TOD message data is transferred from GPSRs 2-1 and 2-2 will be described in detail.

As management and broadcasting control block 32 in the BCP 20 operates, serial communication controller 30 is initialized at step 100. Consecutively, management and broadcasting control block 32 in BCP 20 receives the TOD message data from GPSRs 2-1 and 2-2 every 2 seconds via SCC 30. At step 102, management and broadcasting control block 32 checks whether the TOD message data has been received. If the TOD message data has been received, the management and broadcasting control block 32 will store the TOD message data in memory 34. The management and broadcasting control block 32 checks, at step 106, whether the received data is the correct TOD message data, by referring to the 2-byte header information D19 and D18 of the TOD message data. If the data is the correct TOD message data, management and broadcasting control block 32 will separate, at step 108, the system time from the TOD message data and broadcast the system time to the respective processors $22_1$–$22_N$ in BTS 10 through the High Capacity IPC Node Board Assembly (HINA).

The status management task 40 and the alarm management task 42 periodically operate to support the Real Time Multitasking Operating System (RMOS). In accordance with the periodic operation of status management task 40 and alarm management task 42, management and broadcasting control block 32 checks, at step 110, whether the status information and the alarm information in the received TOD message data has changed. If they have changed, management and broadcasting control block 32 will update the status information and the alarm information of GPSRs 2-1 and 2-2 and report the changes to call control processor (CCP) 8 through status and alarm management block 36 at step 112.

It should be noted from the foregoing description that management and broadcasting control block 32 immediately broadcasts the system time in response to an interrupt from the GPSR. However, the status and alarm are periodically managed. Alternatively, the status and alarm may be continuously managed, via a reconfiguration of the management and broadcasting control block 32, which is implemented in software.

As described in the foregoing, the base station transceiver substation (BTS) of the invention provides stable clocks and accurate system time for proper operation of the base station system. Further, the status and the alarm of the global positioning system receiver (GPSR) can be reported accurately and in detail, so that the base station can be readily maintained. Advantageously, since the BTS of the invention does not require the time and frequency processor (TFP) board, system performance is improved and system cost lowered. Additionally, system failures may be suppressed or quickly removed during system operation.

Although embodiments of the present invention have been described in detail hereinabove, it should be clearly understood that many variations and/or modifications of the basic inventive concepts herein taught which may appear to those skilled in the art will still fall within the spirit and scope of the present invention as defined in the appended claims.

What is claimed is:

1. A method for managing a status and an alarm message of a global positioning system receiver and broadcasting a system time to a base station control processor, comprising the steps of:

receiving status and alarm management message data, system time message data, and verification message data from the global positioning system receiver;

verifying whether the received status and alarm management message data and system time message data are correct by checking the verification message data;

separating system time information from said system time message data if said system time message data is correct; and checking for a change of the status and alarm message in the system time message data.

2. The method of claim 1, further comprising the steps of:

broadcasting the system time to base station control processors; and reporting any change of the status and alarm message to a base station controller.

3. The method of claim 1, wherein said system time is in units of seconds.

4. The method of claim 1, wherein said base station control processor is a dual base station control processor.

5. A method for managing a status and an alarm message of a global positioning system receiver and broadcasting a system time to a base station control processor, comprising the steps of:

receiving message data of said global positioning system receiver, including system time information, message data verification information, and the status and alarm message;

verifying whether the received message data is correct by checking the message data verification information;

separating the system time from said message data if the received message data is correct;

broadcasting the system time to base station control processors; and determining changes of the status and alarm message in the message data.

6. The method of claim 5, further comprising the step of reporting determined changes to a base station controller.

7. The method of claim 5, wherein said system time is broadcasted immediately after being separated from said message data.

8. The method of claim 5, wherein said system time is broadcasted in response to an interrupt from said global positioning system receiver.

9. The method of claim 5, wherein said checking step is performed periodically.

10. The method of claim 5, wherein said separating and broadcasting steps are performed by said base station controller.

11. The method of claim 5, wherein said global positioning system receiver generates and distributes clocks.

12. The method of claim 5, wherein said base station control processor is a dual base station control processor.

13. An apparatus for managing a status message and an alarm message of a global positioning system receiver and broadcasting a system time to a base station control processor, comprising:

means for receiving message data of said global positioning system receiver, said message data including system time information, message data verification information, and said status message and said alarm message;

means for verifying whether the received message data is correct by checking the message data verification information;

means for separating the system time from said message data to broadcast the system time to processors in a base station if the received message data is correct;

means for broadcasting the system time to said processors; and means for determining if said status message and said alarm message in the message data have changed.

14. The apparatus of claim 13, further comprising means for reporting determined changes to a base station controller.

15. The apparatus of claim 13, wherein said base station control processor is a dual base station control processor.

16. An apparatus for managing a status message and an alarm message of a global positioning system receiver and broadcasting a system time, comprising:

said global positioning system receiver receiving current time and positional information from a global positioning system satellite, and generating clocks to respective blocks in a base station and generating self status and alarm management message data and system time message data; and a base station control processor for receiving system time message data including status and alarm management message data, and for separating system time information therefrom to immediately broadcast the system time information to processors of the base station, said base station control processor determining changes of the status and alarm message in the system time message data, and reporting any changes to a base station control device.

17. The apparatus of claim 16, wherein said global positioning system receiver generates the status and alarm management message data and the system time message data every 2 seconds.

* * * * *